United States Patent [19]

Tomita

[11] Patent Number: 5,255,289
[45] Date of Patent: Oct. 19, 1993

[54] SYMBOL TIMING RECOVERY CIRCUIT

[75] Inventor: Hideho Tomita, Tokyo, Japan

[73] Assignee: NEC Corporation, Tokyo, Japan

[21] Appl. No.: 836,867

[22] Filed: Feb. 19, 1992

[30] Foreign Application Priority Data

Feb. 19, 1991 [JP] Japan .................................. 3-024246

[51] Int. Cl.$^5$ .......................................... H04L 27/14
[52] U.S. Cl. ....................................... 375/86; 375/106
[58] Field of Search ....................... 375/83, 84, 85, 88, 375/106, 111; 329/304, 307, 310

[56] References Cited

U.S. PATENT DOCUMENTS

| 4,137,427 | 1/1979 | Choquet et al. | 375/83 |
| 4,704,582 | 11/1983 | Dixon et al. | 329/307 |
| 4,788,696 | 11/1988 | Sakane et al. | 375/111 |
| 5,097,220 | 3/1992 | Shimakata et al. | 375/85 |
| 5,117,195 | 5/1992 | Robbins | 375/83 |

Primary Examiner—Stephen Chin
Attorney, Agent, or Firm—Sughrue, Mion, Zinn, Macpeak & Seas

[57] ABSTRACT

For recovering symbol timing, the instantaneous phase of a received intermediate frequency M-ary PSK signal is sampled at successive phase sampling points of each symbol interval to produce a series of instantaneous phase values so that the phase sampling points divide the interval into first and second half sections. From the instantaneous phase values a phase angle of each half section is derived and a difference between successive phase angles is then detected for each symbol interval. The phase sampling points are controlled with the difference so that it reduces to zero. Data sampling points are determined from the controlled phase sampling points. In a modification, the instantaneous phase of the PSK signal is sampled at successive phase sampling points which are offset on the opposite sides of the data sampling point to produce a pair of instantaneous phase values, which are then converted to corresponding phase deviations with respect to signal points of the PSK signal. A difference between the phase deviations is detected for controlling the phase sampling points.

4 Claims, 3 Drawing Sheets

SYMBOL TIMING RECOVERY CIRCUIT

BACKGROUND OF THE INVENTION

The present invention relates to the recovery of symbol timing from an M-ary PSK (phase shift keyed) signal.

The recovery of symbol timing from a received M-ary PSK signal is necessary for detecting encoded bits. For recovering symbol timing from $\pi/4$-shift QPSK signals, one prior art technique employs a series connection of a frequency discriminator, a rectifier and a narrow-band filter. One shortcoming of this technique is that under low signal-to-noise ratio environments a threshold effect occurs both in the discriminator and rectifier. Another disadvantage is that the prior art circuitry is not amenable to integrated circuit technologies.

SUMMARY OF THE INVENTION

It is therefore an object of the present invention to provide a symbol timing recovery circuit which is amenable to circuit technologies.

Another object of this invention is to provide a symbol timing recovery circuit which assures reliable operations under low signal-to-noise ratio environments.

According to one aspect of the present invention, the instantaneous phase of a received intermediate frequency M-ary PSK signal is sampled at successive phase sampling points of each symbol interval to produce a series of instantaneous phase values, the phase sampling points dividing the symbol interval into equal sections. From the instantaneous phase values a phase angle of each of the equal sections is derived. A difference between successive phase angles is then detected for each symbol interval and the phase sampling points are controlled with the difference so that it reduces to zero. Data sampling points are determined from the controlled phase sampling points. Preferably, the phase sampling points divide each symbol interval into first and second half sections and the phase angle is detected from each of the first half and second half sections.

According to a second aspect of this invention, the instantaneous phase of the M-ary PSK signal is sampled at successive phase sampling points which are offset from a data sampling point on the opposite sides thereof to produce a pair of instantaneous phase values. The instantaneous phase values are then converted to corresponding phase deviations which are measured from signal points of the PSK signal and a difference between the phase deviations is detected for controlling the phase sampling points.

BRIEF DESCRIPTION OF THE DRAWINGS

The present invention will be described in further detail with reference to the accompanying drawings, in which.

DETAILED DESCRIPTION

Figure 1:
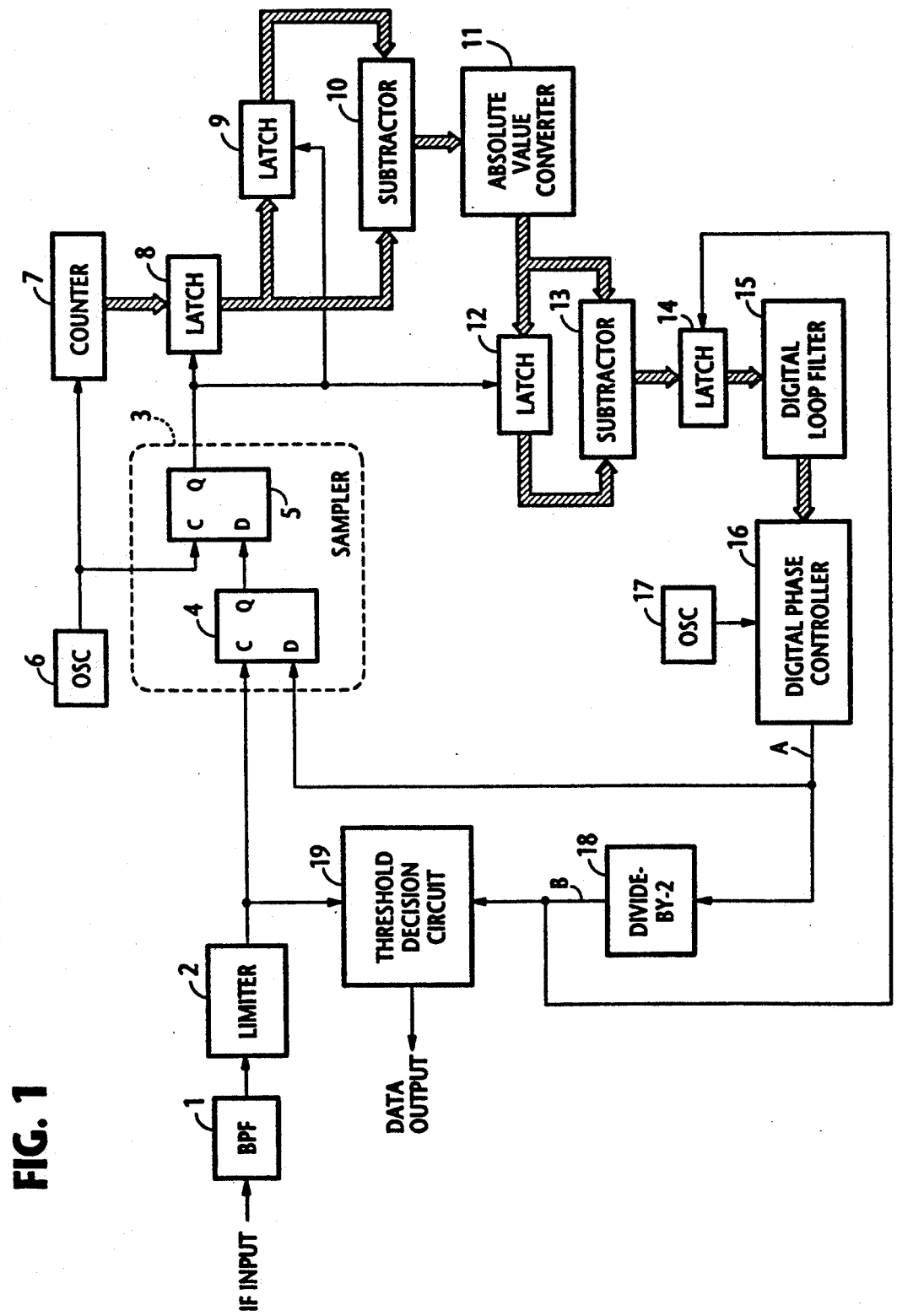
FIG. 1 is a block diagram of a symbol timing recovery circuit according to a first embodiment of the present invention.

Referring now to FIG. 1, there is shown a symbol timing recovery circuit according to a first embodiment of this invention. An IF (intermediate frequency) version of a received QPSK (quadriphase shift keyed) signal or $\pi/4$-shifted QPSK signal is band-limited by a band-pass filter 1 to the symbol rate of the signal and amplitude-limited by a limiter 2 for conversion to unipolar rectangular pulses. The output of amplitude limiter 2 is coupled to the clock input of a D flip-flop 4 of a sampler 3, the limiter output being further applied to a threshold decision circuit 19 for detecting symbols at data sampling points in response to a symbol clock supplied from a divide-by-2 counter 18.

Flip-flop 4 of the sampler receives a sampling pulse on its data input terminal from a digital phase controller 16. This sampling pulse occurs at twice the rate of the symbol clock. The output of flip-flop 4 is applied to the data input of a second D flip-flop 5 of the sampler whose clock input receives clock pulses at a multiple of the intermediate frequency from an oscillator 6. Thus, flip-flop 5 produces a phase sampling pulse A which is almost synchronized with the leading edge of each output pulse from limiter 2 (or zero-crossing point of the IF signal) in the presence of a sampling clock of phase controller 16 and precisely synchronized with the clock timing of oscillator 6. As will be described, the phase sampling pulse is controlled by the output of phase controller 16 to determine an optimum phase sampling point, and hence the optimum data sampling point.

The clock pulse from oscillator 6 is applied as phase resolving pulses to a free-running counter 7 which constantly produces a binary count as an instantaneous phase of each symbol of the IF signal. The output of counter 7 is sampled in response to a phase sampling pulse from sampler 3 and stored in a latch 8, and the contents of latch 8 are subsequently stored into a latch 9 in response to the next phase sampling pulse.

Figure 2:
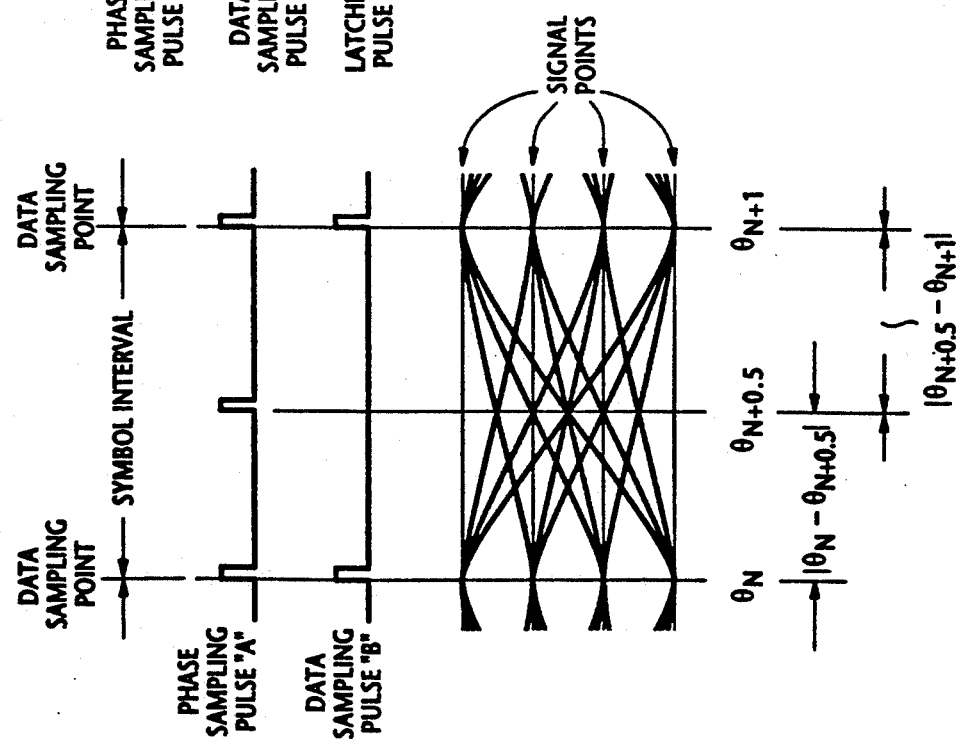
FIG. 2 is a timing diagram associated with the first embodiment, showing an eye pattern of a QPSK signal in relation to phase and data sampling pulses.

As shown in FIG. 2, at a given sampling instant a first phase-angle count $\theta_N$ and a second phase-angle count $\theta_{N+0.5}$ are stored respectively in latches 9 and 8, and at the next sampling instant the second phase $\theta_{N+0.5}$ and a third phase-angle count $\theta_{N+1}$ are stored in latches 9 and 8, respectively. The counts stored in latches 8 and 9 are compared against each other by a subtractor 10 to produce a first phase-angle count $\theta_N - \theta_{N+0.5}$ that occurs during a first half of each symbol interval and successively a second phase-angle count $\theta_{N+0.5} - \theta_{N+1}$.

The absolute values of these phase-angle counts are detected by an absolute value converter 11 and converted to phase-angle counts of absolute values. Each phase-angle count varies at a highest average speed in the neighborhood of the mid point of the symbol interval and at a lowest average speed in the neighborhood of signal points. Therefore, the phase angle values will vary as the phase sampling points are offset with respect to the data sampling points. If the phase sampling points occur at optimum timing, i.e., the periods in which the first and second phase-angle counts are measured coincide precisely with the first and second half periods of each symbol interval, the absolute values of the first and second phase-angle counts of each symbol interval are equal to each other.

The output of absolute value converter 11 is fed into a latch 12 and a subtractor 13. Latch 12 is responsive to the phase sampling pulse from sampler 3 to introduce a delay of one phase-sampling interval to the input signal. The difference between successive phase-angle counts is detected by subtractor 13. Since subtractor 13 also detects a phase difference between a second phase-angle count of a given symbol interval and a first phase-angle count of the next symbol interval, a latch 14 is connected to the subtractor 13 for extracting only those of the phase differences which are detected between the first and second phase-angle counts of the same symbol intervals by using the symbol timing clock from divide-by-2 counter 18 as a latching pulse.

It is seen therefore that if the output of latch 14 is of a non-zero value, the phase sampling point is not synchronized with the data sampling point. The output of latch 14 is passed through a digital loop filter 15 to digital phase controller 16 to which an oscillator 17 supplies clock pulses occurring at a multiple of the symbol rate. The function of phase controller 16 is to produce the phase sampling pulse by extracting as many pulses as necessary from the output of oscillator 17 in a known manner according to the output of digital loop filter 15, and produces a phase sampling pulse at optimum timing at which the difference between the first and second phase-angle counts of each symbol interval is zero. The output of phase controller 16 is applied to divide-by-2 counter 18 in which the phase sampling pulse is divided in frequency to produce a data sampling pulse B, at the symbol rate of the incoming signal. In this way, the phase sampling point is moved in search of an optimum data sampling point at which the eye opening is largest.

Figure 3:
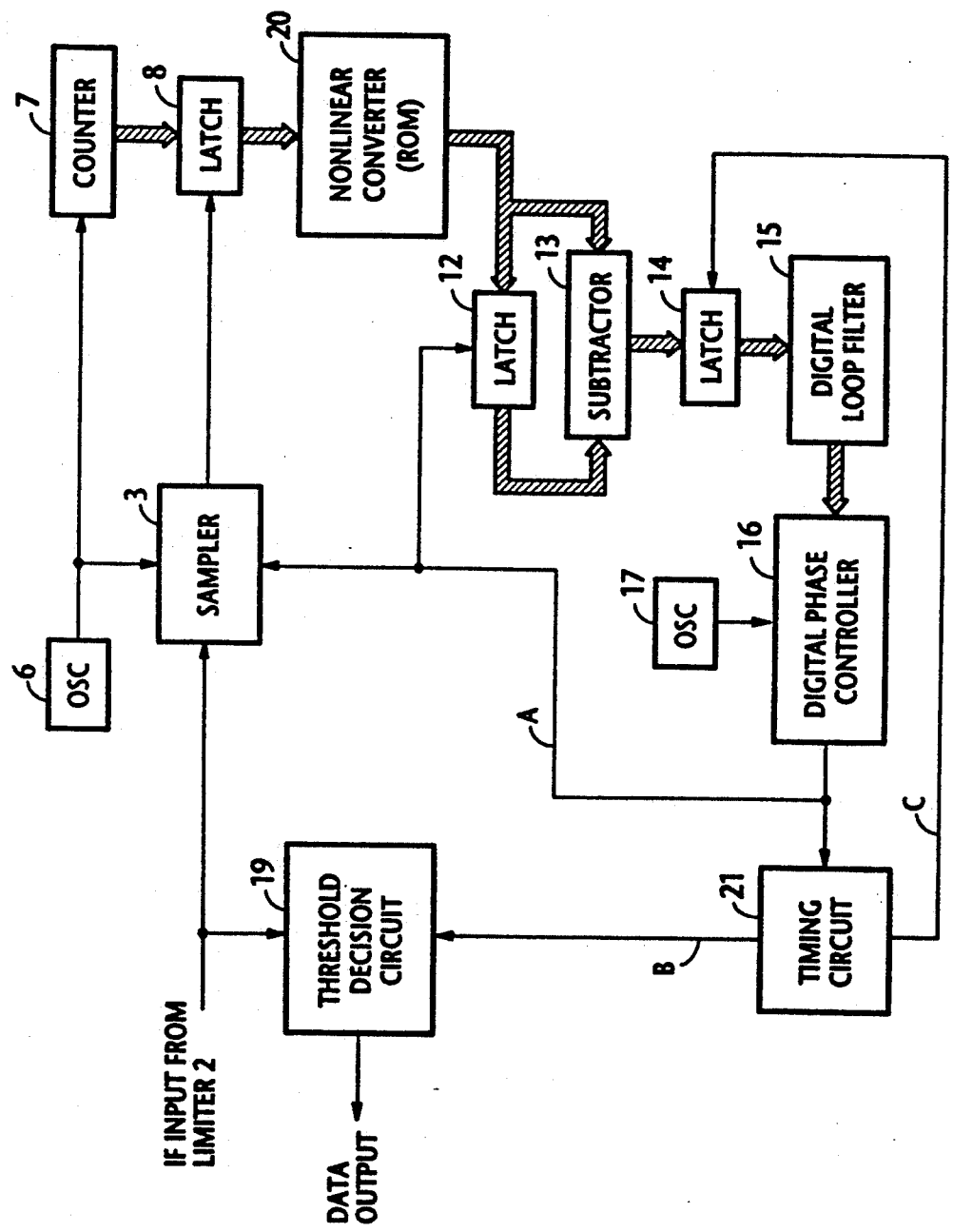
FIG. 3 is a block diagram of a second embodiment of the present invention.

A modified embodiment of this invention is shown in FIG. 3 in which parts corresponding to those of FIG. 1 are marked with the same numerals as used in FIG. 1. According to the modified embodiment phase sampling occurs at a point offset on the earlier side of each data sampling point and at a point offset on the later side of the data sampling point, and phase deviations from signal points, rather than phase-angle counts, are used to determine phase sampling instants. For this purpose, a nonlinear converter 20 is connected to the output of latch 8 and a timing circuit 21 is provided for generating a phase sampling pulse A, a data sampling pulse B and a latching pulse C.

Figure 4:
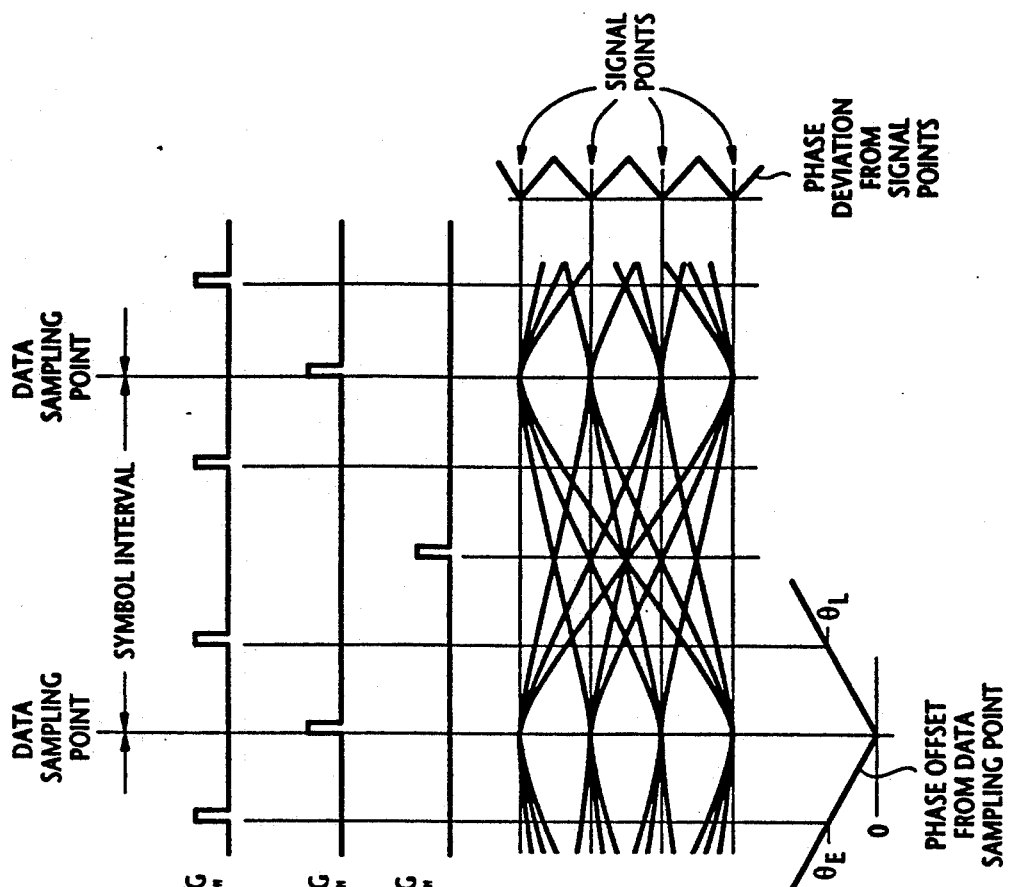
FIG. 4 is a timing diagram associated with the second embodiment, illustrating an eye pattern of a QPSK signal in relation to phase and data sampling pulses and a latching pulse.

As shown in FIG. 4, each phase timing pulse A is offset by an amount, say, ¼ of the symbol interval on one side of a data sampling point and each latching pulse C is offset by an amount, say, ½ of the symbol interval with respect to the data sampling points. Therefore, in response to successive phase sampling pulses that occur on both sides of a data sampling point, latch 8 successively stores phase counts from counter 7 as corresponding to phase offsets $\theta_E$ and $\theta_L$ which vary with respect to that data sampling point, taking the form of a triangular path.

The effect of nonlinear converter 20 is to convert the phase offset with respect to a data sampling point to a phase deviation of absolute value with respect to some reference points which are taken to correspond to the signal points of the eye pattern of a QPSK signal (see FIG. 4). The phase deviation with respect to a signal point follows a triangular path and is unique to the corresponding phase offset value on the horizontal axis, nonlinear converter 20 is implemented with a read only memory for mapping input and output phase relationships.

The output of converter 20 is successively delayed by latch 12 and compared by subtractor 13 to produce a differential phase as a controlling parameter of the closed feedback loop. The output of subtractor 13 is stored into latch 14 in response to the latching pulse C. Since subtractor 13 also detects a phase difference between successive phase deviations that occur in the same symbol intervals, latch 14 is responsive to the latching pulse C for extracting only those of the phase differences which are derived from the opposite sides of each data sampling point. Digital phase controller 16 responds to the output of latch 14 supplied through loop filter 15 and shifts the phase sampling points so that the phase difference stored in latch 14 is reduced to zero.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A symbol timing recovery circuit for an intermediate frequency M-ary PSK (phase shift keyed) signal, comprising:

phase detector means for detecting the instantaneous phase of a received intermediate frequency M-ary PSK signal at successive phase sampling points of each symbol interval of the signal to produce a series of instantaneous phase values, said phase sampling points dividing the symbol interval into equal sections;

phase angle detector means for successively detecting a phase angle of each of the equal sections from said instantaneous phase values;

phase variation detector means for detecting a difference between the phase angles successively detected by the phase angle detector means during each symbol interval;

phase control means for controlling said phase sampling points in accordance with said difference so that same is reduced to zero; and means for determining data sampling points from the controlled phase sampling points, wherein said phase detector means comprises:

limiter means for converting said PSK signal into rectangular pulses;

an oscillator for generating clock pulses at a multiple of the intermediate frequency;

a counter for counting said clock pulses to produce a phase count as said instantaneous phase of the PSK signal;

sampler means synchronized with a leading edge of each of said rectangular pulses and each of said phase sampling points for producing a sampling pulse; and a latch connected to the counter and responsive to said sampling pulse for latching the phase count from the counter as said instantaneous phase value.

2. A symbol timing recovery circuit as claimed in claim 1, wherein said phase sampling points divide each symbol interval into first and second half sections and said phase angle is detected from each of said first half and second half sections.

3. A symbol timing recovery circuit for an intermediate frequency M-ary PSK (phase shift keyed) signal, comprising:

phase detector means for detecting the instantaneous phase of a received intermediate frequency M-ary PSK signal at successive phase sampling points which are offset from a data sampling point on the opposite sides thereof to produce a pair of instantaneous phase values;

converter means for translating said instantaneous phase values to corresponding phase deviations which are measured from signal points of the PSK signal;

phase variation detector means for detecting a difference between said phase deviations;

phase control means for controlling said phase sampling points in accordance with said difference so that same is reduced to zero; and means for determining said data sampling point from the controlled phase sampling points.

4. A symbol timing recovery circuit as claimed in claim 3, wherein said phase detector means comprises:

limiter means for converting said PSK signal into rectangular pulses;

an oscillator for generating clock pulses at a multiple of the intermediate frequency;

a counter for counting said clock pulses to produce a phase count as said instantaneous phase of the PSK signal;

sampler means synchronized with a leading edge of each of said rectangular pulses and each of said phase sampling points for producing a sampling pulse; and a latch connected to the counter and responsive to said sampling pulse for latching the phase count from the counter as said instantaneous phase value.

* * * * *